(12) United States Patent
Ko et al.

(10) Patent No.: US 8,400,958 B2
(45) Date of Patent: Mar. 19, 2013

(54) APPARATUS AND METHOD FOR DATA TRANSMISSION USING TRANSMISSION DIVERSITY IN SC-FDMA SYSTEM

(75) Inventors: Hyun Soo Ko, Gyeongki-do (KR); Seung Hee Han, Gyeongki-do (KR); Jae Hoon Chung, Gyeongki-do (KR); Bin Chul Ihm, Gyeongki-do (KR); Moon Il Lee, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 219 days.

(21) Appl. No.: 13/058,488

(22) PCT Filed: Jun. 5, 2009

(86) PCT No.: PCT/KR2009/003037
§ 371 (c)(1),
(2), (4) Date: Feb. 10, 2011

(87) PCT Pub. No.: WO2010/018922
PCT Pub. Date: Feb. 18, 2010

(65) Prior Publication Data
US 2011/0134903 A1    Jun. 9, 2011

Related U.S. Application Data

(60) Provisional application No. 61/087,975, filed on Aug. 11, 2008, provisional application No. 61/088,353, filed on Aug. 13, 2008.

(30) Foreign Application Priority Data

Dec. 26, 2008 (KR) .................. 10-2008-0134256

(51) Int. Cl.
*H04B 7/204* (2006.01)
(52) U.S. Cl. ............................. 370/319; 375/267

(58) Field of Classification Search .............. 370/344, 370/349, 319; 375/260, 267
See application file for complete search history.

(56) References Cited

U.S. PATENT DOCUMENTS

| | | | |
|---|---|---|---|
| 6,888,809 B1 | 5/2005 | Foschini et al. | |
| 7,881,247 B2 * | 2/2011 | Pan et al. | 370/319 |
| 8,068,555 B2 * | 11/2011 | Jongren et al. | 375/295 |
| 2003/0139139 A1 | 7/2003 | Onggosanusi et al. | |

(Continued)

FOREIGN PATENT DOCUMENTS

| | | |
|---|---|---|
| KR | 2001-0076252 | 8/2001 |
| KR | 2002-0092747 | 12/2002 |

(Continued)

OTHER PUBLICATIONS

Ciochina, C. et al., "Single-Carrier Space-Frequency Block Coding", IEEE 66th Vehicular Technology Conference, 2007, pp. 715-719.

(Continued)

*Primary Examiner* — Brenda H Pham
(74) *Attorney, Agent, or Firm* — Morgan, Lewis & Bockius LLP (57) ABSTRACT

Disclosed is a data transmission apparatus for providing transmission diversity in an SC-FDMA (Single Carrier-Frequency Division Multiple Access) system. The data transmission apparatus comprises: a data processor, which performs coding and modulation on an information bit to generate a data symbol; an SC-FDMA processor, which changes a weight matrix per change-cycle, precodes the data symbol for each weight matrix being changed and performs SC-FDMA modulation for generating an SC-FDMA symbol; and an RF unit, which transmits the SC-FDMA symbol. With the application of a PVS method to the SC-FDMA system, not only can transmission diversity be provided, but PAPR can also be reduced and single-carrier properties can be maintained.

15 Claims, 6 Drawing Sheets

U.S. PATENT DOCUMENTS

| | | |
|---|---|---|
| 2004/0077378 A1 | 4/2004 | Kim et al. |
| 2005/0265280 A1 | 12/2005 | Roh et al. |
| 2006/0067421 A1 | 3/2006 | Walton et al. |
| 2007/0004465 A1 | 1/2007 | Papasakellariou et al. |
| 2007/0115795 A1* | 5/2007 | Gore et al. .................... 370/203 |
| 2007/0189151 A1 | 8/2007 | Pan et al. |
| 2008/0032746 A1 | 2/2008 | Olesen et al. |
| 2008/0056117 A1 | 3/2008 | Muharemovic et al. |
| 2008/0080472 A1 | 4/2008 | Bertrand et al. |
| 2008/0089441 A1 | 4/2008 | Hwang et al. |
| 2008/0117999 A1 | 5/2008 | Kadous et al. |

FOREIGN PATENT DOCUMENTS

| | | |
|---|---|---|
| KR | 2004-0003537 | 1/2004 |
| KR | 2005-0069802 | 7/2005 |
| KR | 2006-0048106 | 5/2006 |
| KR | 10-0785806 | 12/2007 |
| KR | 2008-0025260 | 3/2008 |
| WO | 03/085876 | 10/2003 |

OTHER PUBLICATIONS

International Search Report from PCT/KR2009/003487.
International Search Report from PCT/KR2009/003466.
International Search Report from PCT/KR2009/003037.
International Search Report from PCT/KR2009/003026.
International Search Report from PCT/KR2009/003027.
International Search Report from PCT/KR2009/003012.

* cited by examiner

FIG. 6 ical Application Nos. 61/087,975 and 61/088,353, respectively filed Aug. 11, 2008, and Aug. 13, 2008. The present national stage application also claims the benefit of Korean Patent Application No. 10-2008-0134256, filed Dec. 26, 2008.

APPARATUS AND METHOD FOR DATA TRANSMISSION USING TRANSMISSION DIVERSITY IN SC-FDMA SYSTEM

The present application is a national stage of PCT International Application No. PCT/KR2009/003037, filed Jun. 5, 2009, and claims the benefit of U.S. Provisional Application Nos. 61/087,975 and 61/088,353, respectively filed Aug. 11, 2008, and Aug. 13, 2008. The present national stage application also claims the benefit of Korean Patent Application No. 10-2008-0134256, filed Dec. 26, 2008.

TECHNICAL FIELD

The present invention relates to wireless communications, and more particularly, to an apparatus and method for data transmission capable of providing a transmit diversity in a single carrier-frequency division multiple access (SC-FDMA) system.

BACKGROUND ART

Recently, there has been an explosive increase in the demand for wireless data services. Further, an evolution from a wireless voice service to a wireless data service requires a gradual increase of wireless capacity. To cope with such a demand, wireless service providers and wireless equipment manufacturers attempt to improve a data rate of a wireless system, which results in motivating massive researches.

A wireless channel experiences various problems such as path loss, shadowing, fading, noise, limited bandwidth, power limit of a user equipment (UE), and interference between other users. Due to these limitations, the wireless channel has a shape of a narrow pipe that obstructs fast data flow, and it is difficult to design an effective bandwidth of wireless communication providing high-speed data transmission. The designing of the wireless system has other challenges such as resource allocation, mobile issues in association with a rapidly changing physical channel, portability, security, and privacy.

When a transport channel experiences deep fading, if a different version or a replica of a transmitted signal is not additionally transmitted, it is difficult for a receiver to determine the transmitted signal. A resource corresponding to the different version or the replica is referred to as diversity, and is one of most important factors that contribute to reliable transmission through a wireless channel. The use of the diversity can maximize data transfer capacity or data transfer reliability. A system for implementing the diversity by using multiple transmit (Tx) antennas and multiple receive (Rx) antennas is referred to as a multiple-input multiple-output (MIMO) system. The MIMO system is also referred to as a multiple-antenna system.

Exemplary schemes for diversity implementation in the MIMO system include precoding vector switching (PVS), space frequency block coding (SFBC), space time block coding (STBC), cyclic delay diversity (CDD), frequency switched transmit diversity (FSTD), time switched transmit diversity (TSTD), spatial multiplexing (SM), generalized cyclic delay diversity (GCDD), selective virtual antenna permutation (S-VAP), etc. As one type of transmit diversity schemes, the PVS is a scheme for obtaining a random beamforming gain by switching a precoding vector (i.e., weight) per specific time, slot, or symbol.

Meanwhile, an orthogonal frequency division multiplexing (OFDM) system capable of reducing inter-symbol interference with a low complexity is taken into consideration as one of post-3$^{rd}$ generation wireless communication systems. In the OFDM, a serially input data symbol is converted into N parallel data symbols, and is then transmitted by being carried on N orthogonal subcarriers. The subcarriers maintain orthogonality in a frequency dimension. An orthogonal frequency division multiple access (OFDMA) is a multiple access scheme for achieving multiple access by independently providing some of available subcarriers to each user in a system using the OFDM as a modulation scheme.

One of main problems of the OFDM/OFDMA system is that a peak-to-average power ratio (PAPR) can be significantly large. The PAPR problem occurs when a peak amplitude of a Tx signal is significantly larger than an average amplitude. Further, the PAPR problem is caused by a fact that an OFDM symbol is an overlap of N sinusoidal signals on different subcarriers. The PAPR is particularly problematic in a UE sensitive to power consumption in association with battery capacity. Therefore, the PAPR needs to be lowered to decrease power consumption.

Single carrier-frequency division multiple access (SC-FDMA) is proposed to decrease the PAPR. The SC-FDMA is frequency division multiple access (FDMA) combined with single carrier-frequency division equalization (SC-FDE). The SC-FDMA is similar to the OFDMA in that data is modulated and demodulated in a time domain and a frequency domain by using discrete Fourier transform (DFT). However, the SC-FDMA is advantageous to decrease Tx power since a Tx signal has a low PAPR. In particular, regarding battery usage, the SC-FDMA is advantageous in case of uplink transmission where communication is achieved from a UE sensitive to Tx power to a base station (BS). When the UE transmits data to the BS, the transmitted data does not require a large bandwidth but a wide coverage is important for power concentration. The SC-FDMA system allows a small signal variation, and thus has a much wider coverage than other systems when using the same power amplifier.

Meanwhile, unlike the SC-FDMA system, clustered DFT-spread-OFDM (DFT-S-OFDM) allocates (or maps) M(<N) symbol streams among N symbol streams which are DFT spread, and allocates (or maps) the remaining N-M symbol streams to consecutive subcarriers spaced apart by a specific interval from a subcarrier on which the M symbol streams are allocated (or mapped). Advantageously, frequency selective scheduling can be performed when using the clustered DFT-S-OFDM.

However, it should be noted that a single-carrier property has to be satisfied when applying the SC-FDMA scheme. By using the SC-FDMA scheme or the clustered DFT-S-OFDM scheme, the wireless communication system has to be capable of providing a transmit diversity to decrease the PAPR. Accordingly, there is a need for an apparatus and method for data transmission capable of providing the transmit diversity to decrease the PAPR.

DISCLOSURE

Technical Problem

The present invention provides a method and apparatus for data transmission capable of maintaining a single-carrier property which is importantly considered in a single carrier-frequency division multiple access (SC-FDMA) system while providing a transmit diversity to the SC-FDMA system.

Technical Solution

According to an aspect of the present invention, a data transmission apparatus is provided. The apparatus includes a data processing unit for performing coding and modulation on an information bit to generate a data symbol, a single carrier-frequency division multiple access (SC-FDMA) processing unit for switching a weight matrix per switching period, for performing precoding on the data symbol by using the switched weight matrix, and for performing SC-FDMA modulation to generate an SC-FDMA symbol, and a radio frequency (RF) unit for transmitting the SC-FDMA symbol.

According to another aspect of the present invention, A data transmission apparatus is provided. The apparatus includes a data processing unit for performing coding and modulation on an information bit to generate a data symbol, a discrete Fourier transform (DFT) unit for performing DFT on the data symbol to generate a frequency-domain symbol, a precoding control unit for switching a weight matrix per switching period which is set as a slot or single carrier-frequency division multiple access (SC-FDMA) symbol, and for providing the switched weight matrix to a precoding unit the precoding unit for performing precoding on the frequency-domain symbol by using the switched weight matrix, a subcarrier mapper for mapping the precoded frequency-domain symbol to a subcarrier, an inverse fast Fourier transform (IFFT) unit for performing IFFT on an output of the subcarrier mapper to generate an SC-FDMA symbol, and a radio frequency (RF) unit for transmitting the SC-FDMA symbol.

According to yet another aspect of the present invention, a data transmission method in a wireless communication system is provided. The method includes performing coding and modulation on an information bit to generate a data symbol, performing precoding on the data symbol by using a weight matrix which is switched in a switching period, performing a process of generating a transmission symbol for the precoded data symbol, and transmitting the transmission symbol.

Advantageous Effects

According to the present invention, a transmit diversity can be provided by applying a precoding vector switching (PVS) scheme to a single carrier-frequency division multiple access (SC-FDMA) system. In addition, a peak-to-average power ratio (PAPR) can be reduced and a single-carrier property can be maintained.

MODE FOR INVENTION

Figure 1:
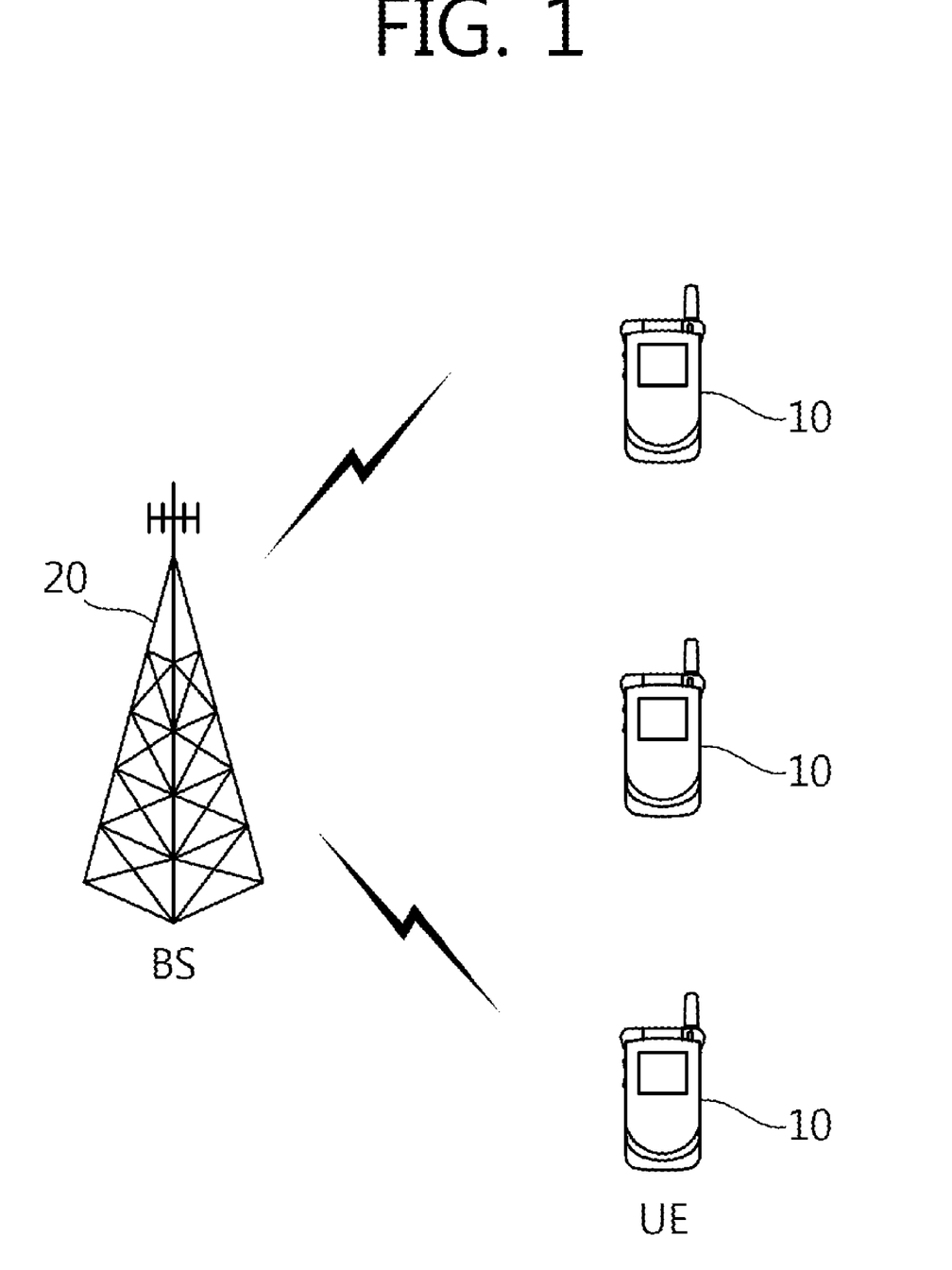
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There may be one or more cells within the coverage of the BS 20.

A downlink (DL) represents a communication link from the BS 20 to the UE 10, and an uplink (UL) represents a communication link from the UE 10 to the BS 20. In the DL, a transmitter may be a part of the BS 20, and a receiver may be a part of the UE 10. In the UL, the transmitter may be a part of the UE 10, and the receiver may be a part of the BS 20.

The wireless communication system may be a multiple-antenna system. The multiple-antenna system may be a multiple-input multiple-output (MIMO) system. The multiple-antenna system may be a multiple-input single-output (MISO) system, a single-input single-output (SISO) system, or a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

Example of a multiple-antenna transmission/reception scheme used for an operation of the multiple-antenna system include precoding vector switching (PVS), frequency switched transmit diversity (FSTD), space frequency block code (SFBC), space time block code (STBC), cyclic delay diversity (CDD), time switched transmit diversity (TSTD), etc. In case of a rank 2 or higher ranks, the scheme may be spatial multiplexing (SM), generalized cyclic delay diversity (GCDD), selective virtual antenna permutation (S-VAP), etc. As one type of transmit diversity schemes, the PVS is a scheme for obtaining a random beamforming gain by switching a precoding vector (i.e., weight) per specific time, slot, or symbol.

DL transmission and UL transmission may use different multiple access schemes. For example, DL transmission may use OFDMA, and UL transmission may use SC-FDMA or clustered discrete Fourier transform spread orthogonal frequency division multiplexing (DFT-S-OFDM). A typical SC-FDMA scheme implies that DFT-spread symbol streams are allocated (or mapped) to consecutive subcarriers or interleaved subcarriers. The clustered DFT-S-OFDM allocates (or maps) M(<N) symbol streams among N symbol streams which are DFT spread, and allocates (or maps) the remaining N-M symbol streams to consecutive subcarriers spaced apart by a specific interval from a subcarrier on which the M symbol streams are allocated (or mapped). Advantageously, frequency selective scheduling can be performed when using the clustered DFT-S-OFDM.

Figure 2:
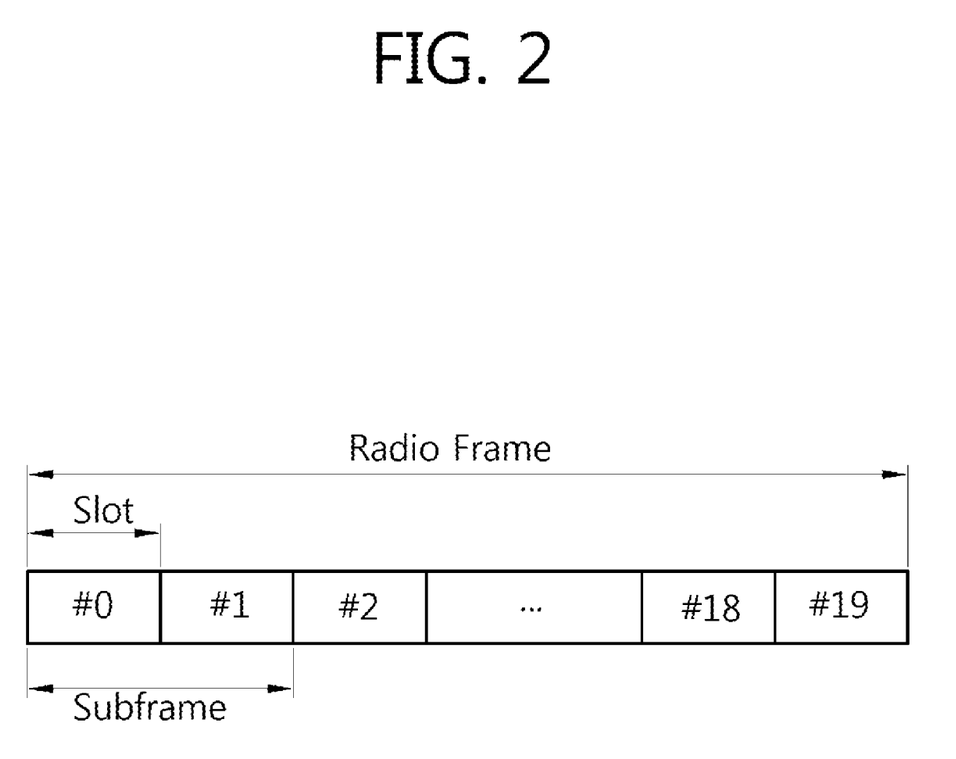
FIG. 2 shows an example of a radio frame.

FIG. 2 shows an example of a radio frame.

Referring to FIG. 2, the radio frame consists of 10 subframes. One subframe may include two slots. One slot may include a plurality of SC-FDMA symbols (or OFDM symbols) in a time domain and at least one subcarrier in a frequency domain. The slot may be a unit of allocating radio resources in the time domain and the frequency domain.

The number of SC-FDMA symbols included in one slot may vary according to configuration of a cyclic prefix (CP). The CP is classified into an extended CP and a normal CP. For example, if the SC-FDMA symbols are configured by the normal CP, the number of SC-FDMA symbols included in one slot may be 7. If the SC-FDMA symbols are configured by the extended CP, a length of one SC-FDMA symbol is decreased, and thus the number of SC-FDMA symbols included in one slot is less than that of the case of using the normal CP. For example, the number of SC-FDMA symbols included in one slot may be 6. In a case where a channel condition is unstable, for example, when a UE moves in a fast speed, the extended CP can be used to further decrease inter-symbol interference or may be used to support a multicast broadcast single frequency network (MBSFN) related to a multimedia broadcast multicast service (MBMS).

The structure of the radio frame is for exemplary purposes only, and thus the number of subframes included in the radio frame, the number of slots included in the subframe, and the number of SC-FDMA symbols included in the slot may also change variously.

Figure 3:
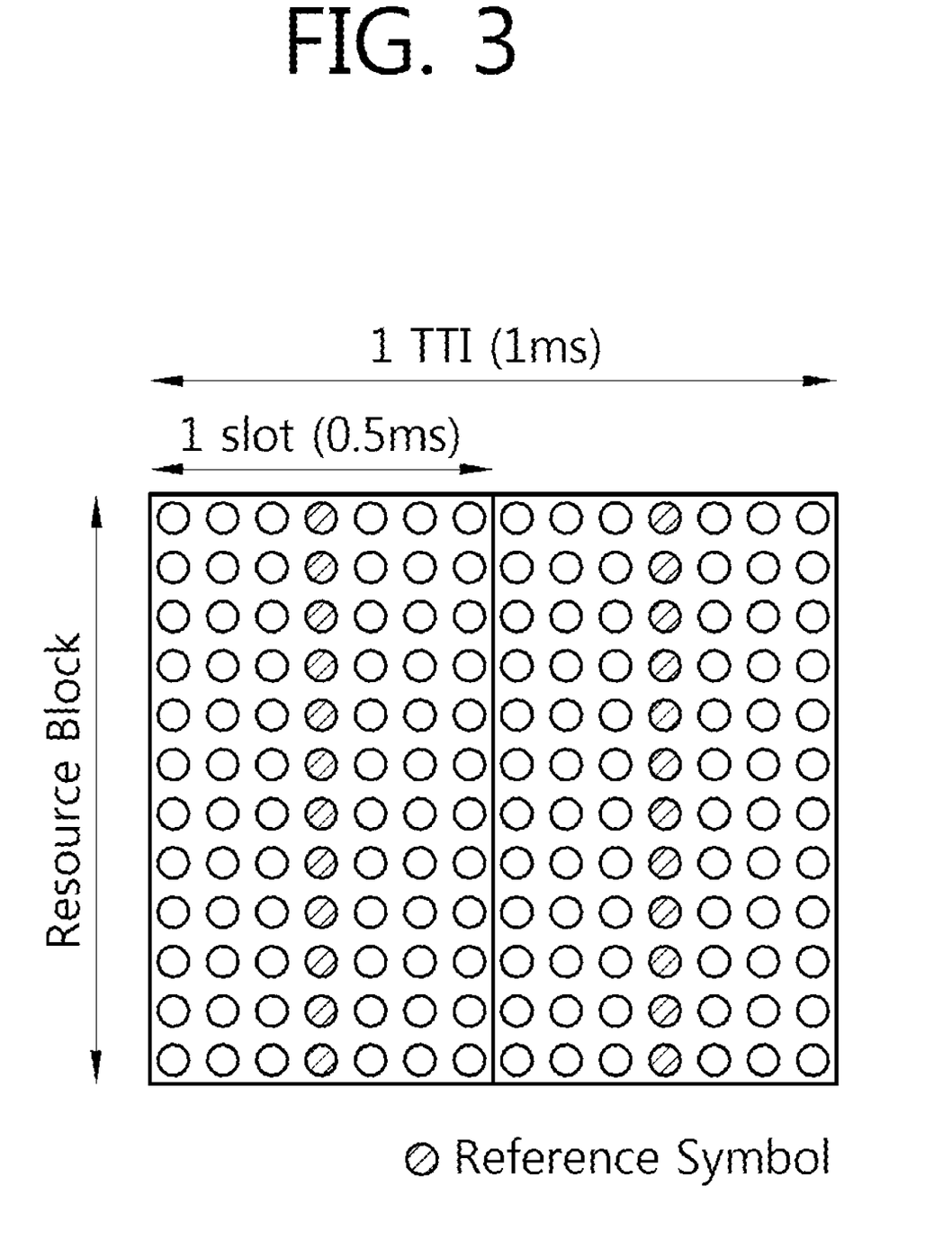
FIG. 3 shows an example of a subframe.

FIG. 3 shows an example of a subframe. In this case, an SC-FDMA symbol is configured with a normal CP.

Referring to FIG. 3, the subframe includes two slots. Since the SC-FDMA symbol is configured with the normal CP, one slot includes 7 SC-FDMA symbols in a time domain. Therefore, one subframe includes 14 SC-FDMA symbols in total. Meanwhile, one slot includes a plurality of resource blocks (RBs) in a frequency domain. A unit consisting of one SC-FDMA symbol and one subcarrier is referred to as a resource element. When one RB includes 12 subcarriers, one RB includes 12×7 resource elements. One SC-FDMA symbol in each slot is allocated for transmission of a demodulation reference signal (DMRS) used for data demodulation. The remaining SC-FDMA symbols are allocated for data transmission, and thus 12 SC-FDMA symbols in total are allocated for data transmission within one subframe. If a sounding reference signal (SRS) for UL channel estimation is transmitted on one SC-FDMA symbol in addition to the DMRS, 11 SC-FDMA symbols in total are allocated for data transmission within one subframe. The SRS can be transmitted on a last SC-FDMA symbol of a second slot.

The structure of the subframe is for exemplary purposes only. Thus, the number of slots included in the subframe, the number of SC-FDMA symbols included in the slot, and a position of the SC-FDMA symbol allocated to the DMRS may change variously.

Although a transmitter including two antennas will be described hereinafter for example in the embodiment of the present invention, the present invention is not limited thereto. Thus, the number of antennas may change in the present invention.

Figure 4:
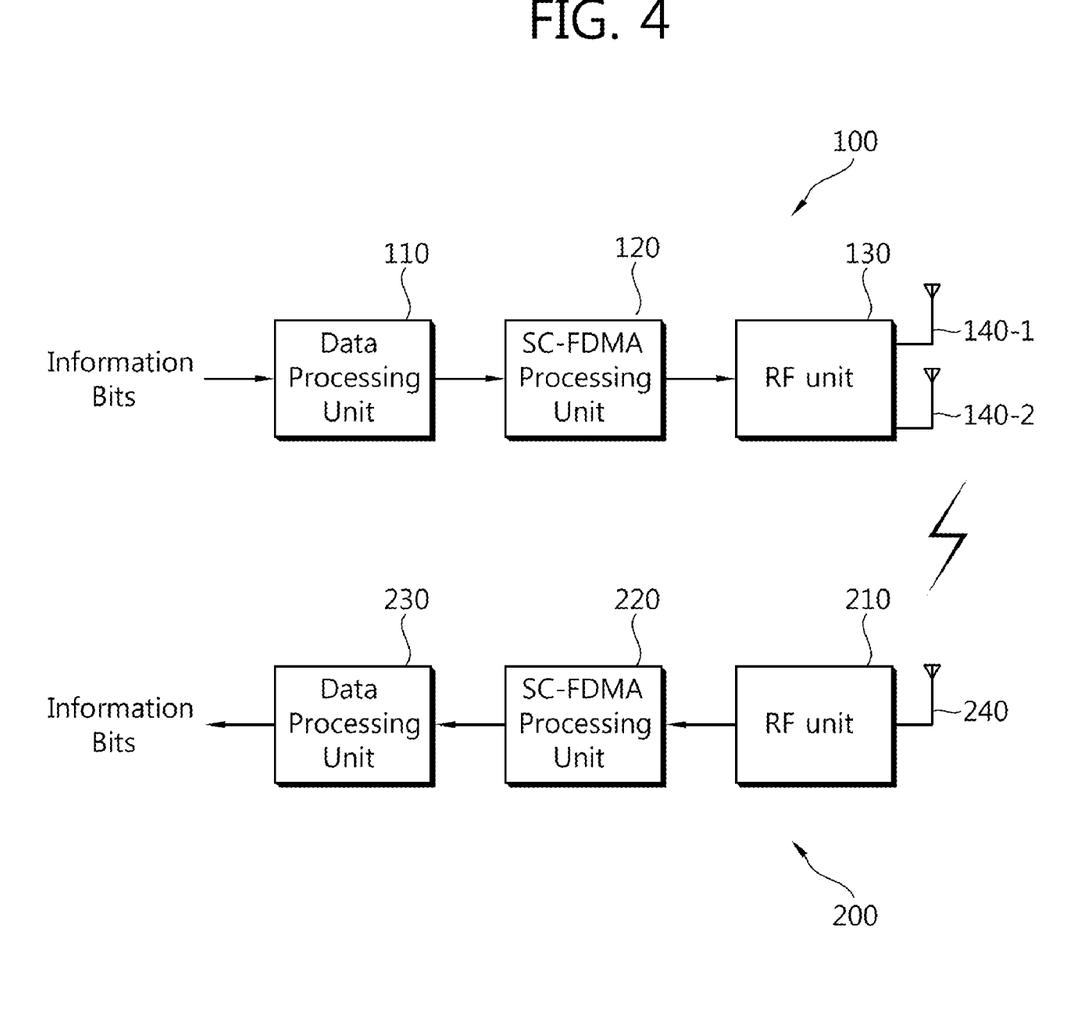
FIG. 4 is a block diagram showing a data transmission apparatus and a data reception apparatus according to an embodiment of the present invention.

FIG. 4 is a block diagram showing a data transmission apparatus and a data reception apparatus according to an embodiment of the present invention.

Referring to FIG. 4, the data transmission apparatus 100 includes a data processing unit 110, an SC-FDMA processing unit 120, a radio frequency (RF) unit 130, and Tx antennas 140-1 and 140-2.

The data processing unit 110 performs channel coding on an input information bit to generate a codeword, and performs constellation mapping on the codeword to generate a modulation symbol. The information bit includes user plane information to be transmitted to a data reception apparatus 200. Further, the information bit may include control plane information in association with transmission of the user plane information or radio resource allocation.

The SC-FDMA processing unit 120 performs precoding on a data symbol by using a different weight matrix per SC-FDMA symbol or per slot or per subframe according to a PVS scheme, performs modulation by using an SC-FDMA modulation scheme, and thus generates an SC-FDMA symbol. The SC-FDMA modulation includes a series of processes for generating the SC-FDMA symbol, such as a DFT operation, subcarrier mapping, and an inverse fast Fourier transform (IFFT) operation. The control plane information may be input to the SC-FDMA processing unit 120 after being modulated independently from the user plane information. The RF unit 130 converts an input SC-FDMA symbol into an analog signal. The converted analog signal is propagated to a wireless channel through the Tx antennas 140-1 and 140-2.

The data reception apparatus 200 includes an RF unit 210, an SC-FDMA processing unit 220, a data processing unit 230, and an Rx antenna 240. The RF unit 210 converts a signal received through the Rx antenna 240 into a digital signal. The SC-FDMA processing unit 220 of the receiver 200 outputs the data symbol by performing an operation opposite to that of the SC-FDMA processing unit 120 of the transmitter 100. The data processing unit 230 recovers an information bit from the data symbol.

Figure 5:
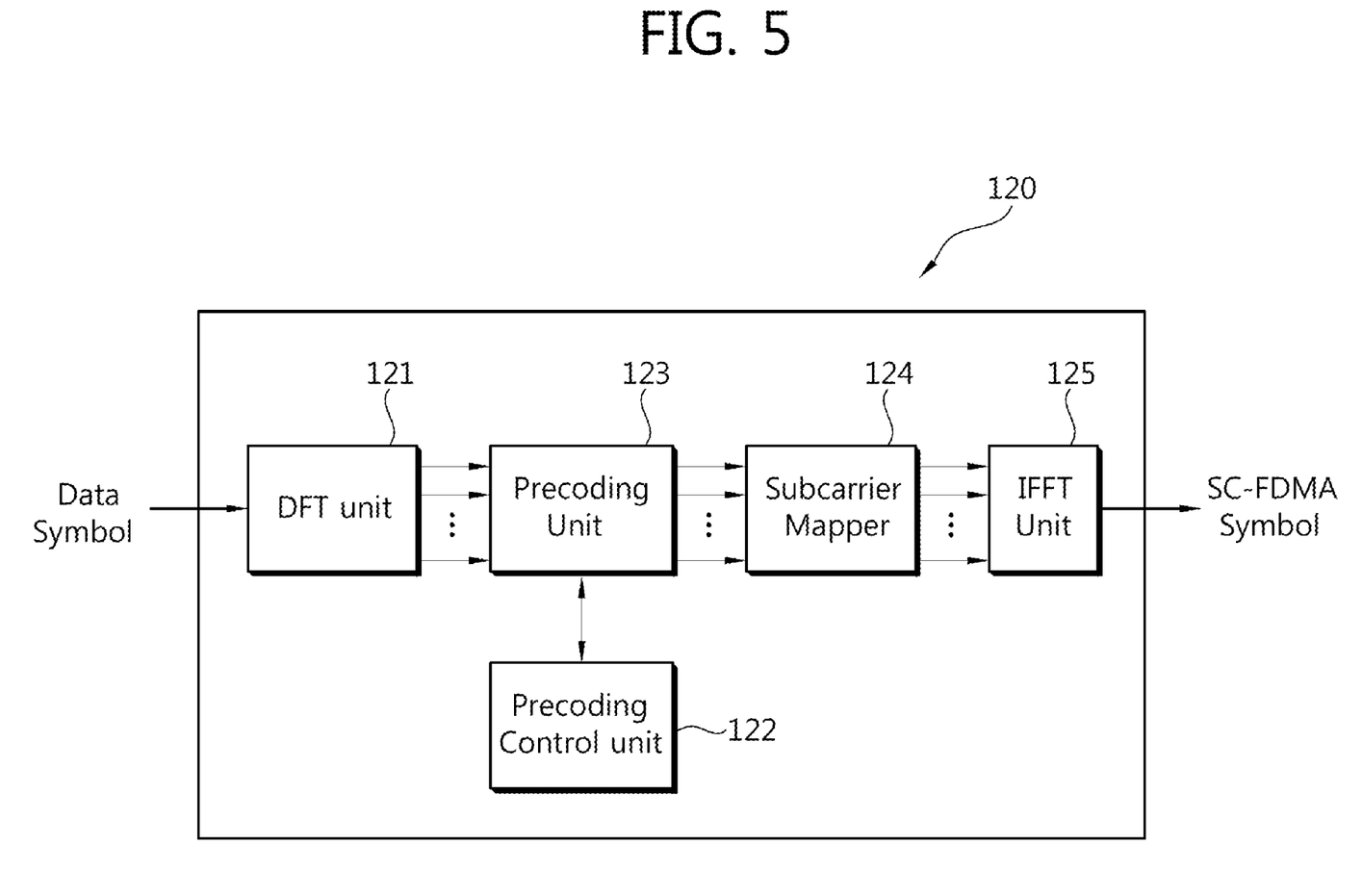
FIG. 5 is a block diagram showing an example of an SC-FDMA processing unit of a transmitter according to the present invention.

FIG. 5 is a block diagram showing an example of an SC-FDMA processing unit of a transmitter according to the present invention.

Referring to FIG. 5, an SC-FDMA processing unit 120 includes a DFT unit 121, a precoding control unit 122, a precoding unit 123, a subcarrier mapper 124, and an IFFT unit 125.

The DFT unit 121 outputs a frequency-domain symbol by performing DFT on a data symbol. The data symbol input to the DFT unit 121 may be control information and/or user data. The DFT size may be fixed to a size of allocated resource blocks, or may vary depending on a system.

The precoding control unit 122 controls a weight matrix or a weight vector to be used by the precoding unit 123. More specifically, the precoding control unit 122 may switch the weight matrix to be applied to the precoding unit 123 according to a specific switching period. Information regarding the switching period and the switched weight matrix may be predetermined information known in advance to a BS and a UE, or may be information included in system information and transmitted periodically to the UE. The switching period may be fixed or variable depending on the system.

For one example, the precoding control unit 122 may provide the precoding unit 123 with the switched weight matrix per slot by regarding each slot as the switching period. When the switching period is based on the slot, the same weight matrix is applied to all SC-FDMA symbols in one slot. For another example, the precoding control unit 122 may provide the precoding unit 123 with the switched weight matrix per SC-FDMA symbol by regarding each SC-FDMA symbol as the switching period. Even if the weight matrix is switched per SC-FDMA symbol, a switching pattern may be repeated per slot or per subframe. For example, if a sequence of a weight matrix applied per SC-FDMA symbol is $W_1, W_3, W_4, W_2, W_6, W_5$, and $W_7$, such a sequence is cyclically repeated for all slots.

As such, the precoding control unit 122 can switch (or control) the weight matrix provided to the precoding unit 123 per slot or per SC-FDMA symbol. Since a different weight matrix is used per slot or per SC-FDMA symbol, a spatial diversity gain can be obtained.

The weight matrix that varies depending on the switching period may be obtained from a set of weight matrixes having a pre-defined codebook format. For example, if the set of weight matrixes is $\{W_1, W_2, W_3, W_4, W_5\}$, then $\{W_1, W_3, W_4\}$ may be determined to a subset, and the weight matrix to be applied to each slot may be switched within the subset. For example, when the switching period is based on the slot, if the weight matrix $W_1$ is provided to the precoding unit 123 in a first slot, then the weight matrix $W_3$ may be provided to the precoding unit 123 in a second slot (herein, $W_1 * W_3$).

As an example of the pre-defined codebook, a codebook which uses two Tx antennas and which is used in MIMO transmission of a rank 1 is as shown in Table 1.

TABLE 1

| codebook index | weight vector |
|---|---|
| 0 | $\frac{1}{\sqrt{2}}\begin{bmatrix}1\\1\end{bmatrix}$ |
| 1 | $\frac{1}{\sqrt{2}}\begin{bmatrix}1\\-1\end{bmatrix}$ |
| 2 | $\frac{1}{\sqrt{2}}\begin{bmatrix}1\\j\end{bmatrix}$ |
| 3 | $\frac{1}{\sqrt{2}}\begin{bmatrix}1\\-j\end{bmatrix}$ |

In the pre-defined codebook of Table 1, weight vectors indexed with 0 and 1 and weight vectors indexed with 2 and 3 may be determined as subsets, and the weight vectors may be switched within each subset.

Another example of the pre-defined codebook is a codebook which uses 4 Tx antennas and which is used in MIMO transmission of a rank 1, as shown in Table 2.

TABLE 2

| codebook | 0 | 1 | 2 | 3 | 4 | 5 | 6 | 7 |
|---|---|---|---|---|---|---|---|---|
| weight vector | $\begin{bmatrix}1\\-1\\-1\\-1\end{bmatrix}$ | $\begin{bmatrix}1\\-j\\-1\\j\end{bmatrix}$ | $\begin{bmatrix}1\\1\\-1\\1\end{bmatrix}$ | $\begin{bmatrix}1\\j\\1\\-j\end{bmatrix}$ | $\begin{bmatrix}1\\\frac{-1-j}{\sqrt{2}}\\-j\\\frac{1-j}{\sqrt{2}}\end{bmatrix}$ | $\begin{bmatrix}1\\\frac{1-j}{\sqrt{2}}\\j\\\frac{-1-j}{\sqrt{2}}\end{bmatrix}$ | $\begin{bmatrix}1\\\frac{1+j}{\sqrt{2}}\\-j\\\frac{-1+j}{\sqrt{2}}\end{bmatrix}$ | $\begin{bmatrix}1\\\frac{-1+j}{\sqrt{2}}\\j\\\frac{1+j}{\sqrt{2}}\end{bmatrix}$ |

| codebook | 8 | 9 | 10 | 11 | 12 | 13 | 14 | 15 |
|---|---|---|---|---|---|---|---|---|
| weight vector | $\begin{bmatrix}1\\-1\\1\\1\end{bmatrix}$ | $\begin{bmatrix}1\\-j\\-1\\-j\end{bmatrix}$ | $\begin{bmatrix}1\\1\\1\\-1\end{bmatrix}$ | $\begin{bmatrix}1\\j\\-1\\j\end{bmatrix}$ | $\begin{bmatrix}1\\-1\\-1\\1\end{bmatrix}$ | $\begin{bmatrix}1\\-1\\1\\-1\end{bmatrix}$ | $\begin{bmatrix}1\\1\\-1\\-1\end{bmatrix}$ | $\begin{bmatrix}1\\1\\1\\1\end{bmatrix}$ |

In the pre-defined codebook of Table 2, a subset of 4 weight vectors indexed with 12, 13, 14, and 15 may be configured, or a subset of 2 weight vectors indexed with 13 and 15 and/or 12 and 14 may be configured. The precoding control unit 122 may include a memory (not shown) in which the pre-defined codebook of Table 1 or Table 2 is stored.

The precoding unit 123 performs precoding which multiplies the weight matrix provided from the precoding control unit 122 by a frequency-domain symbol. Herein, the weight matrix may also be called a precoding matrix. The weight matrix may be known in advance to both a transmitter and a receiver, or may be reported by using information which is fed back by the receiver. In an SC-FDMA system, the precoding unit 123 can satisfy a single-carrier property by applying the same weight matrix to all frequency bands of an allocated resource.

For example, the precoding unit 123 may apply precoding to a reference signal which is common to each of the Tx antennas 140-1 and 140-2. The reference signal to which the precoding is applied is referred to as a precoded reference signal. When data is transmitted by using the precoded reference signal, the receiver 200 can know a weight matrix which has experienced a radio channel directly without additional signaling. Therefore, there is an advantage in that data modulation can be promptly performed per slot.

For another example, the precoding unit 123 may apply precoding to a reference signal, which is transmitted by being multiplexed in various formats, to each of the Tx antennas 140-1 and 140-2. The reference signal may be transmitted to each of the Tx antennas 140-1 and 140-2 by being multiplexed using frequency division multiplexing, time division multiplexing, or code division multiplexing. When the precoded reference signal is used in this manner, the data reception apparatus 200 can estimate a channel for each of the Tx antennas 140-1 and 140-2 and can perform data demodulation per slot by combining the weight matrixes.

The subcarrier mapper 124 allocates the precoded frequency-domain symbol to each subcarrier according to a variety of signal configurations. Herein, each subcarrier is allocated by being split for each of the Tx antennas 140-1 and 140-2.

The IFFT unit 125 performs IFFT on an output of the subcarrier mapper 124 and thus outputs an SC-FDMA symbol which is a time-domain symbol. As such, when modulation is performed by combining DFT and IFFT, this is called SC-FDMA which is advantageous to decrease a peak-to-average power ratio (PAPR) in comparison with OFDM that uses only IFFT. This is because the SC-FDMA has the single-carrier property.

Figure 6:
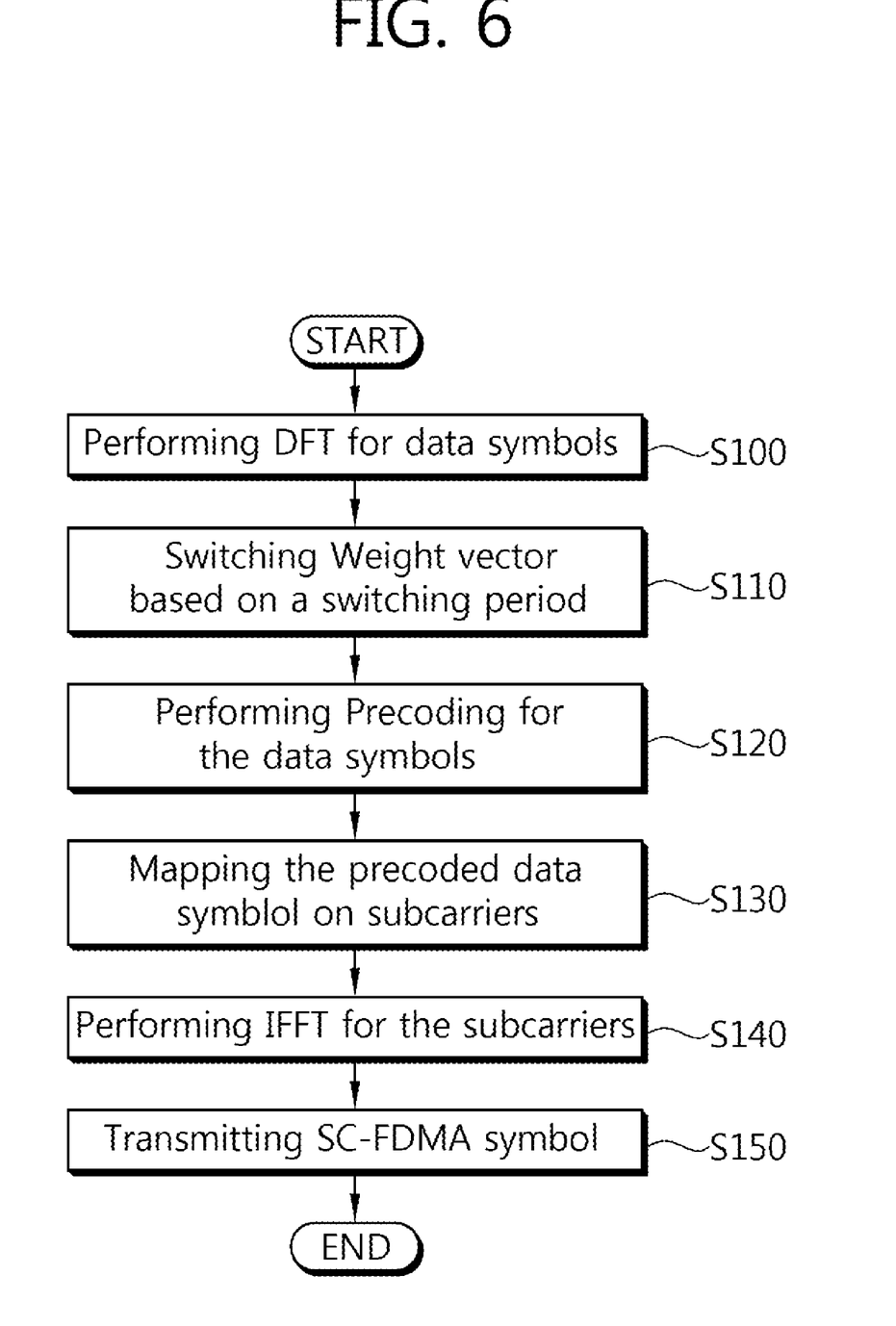
FIG. 6 is a flowchart for explaining a data transmission method in a wireless system according to the present invention.

FIG. 6 is a flowchart for explaining a data transmission method in a wireless system according to the present invention.

Referring to FIG. 6, DFT is performed on an input data symbol (step S100). A weight vector is switched according to a switching period (step S110). The switching period may be based on a slot or a transmission symbol. Herein, the transmission symbol may be any one of an SF-FDMA symbol and a clustered DFT-S-OFDM symbol. Precoding is performed on a frequency-domain symbol obtained as a result of the DFT operation by using the switched weight vector (step S120). The precoding may be performed by multiplying the frequency-domain symbol by the weight vector. The precoded frequency-domain symbol is called a precoded symbol.

The precoded symbol is mapped to each subcarrier of an allocated frequency band (step S130). Herein, the switched weight vector is equally applied to the allocated frequency band. If the transmission symbol is the SC-FDMA symbol, the precoded symbol is allocated (or mapped) to contiguous subcarriers or equidistant subcarriers. If the transmission symbol is the clustered DFT-S-OFDM symbol, among N precoded symbols, M(<N) symbol streams are allocated (or mapped) to contiguous subcarriers, and the remaining N-M symbol streams are allocated (or mapped) to consecutive subcarriers spaced apart by a specific interval from a subcarrier on which the M symbol streams are allocated (or mapped).

IFFT is performed on the precoded symbol which is mapped to the subcarrier (step S140). The SC-FDMA symbol or clustered DFT-S-OFDM symbol generated as a result of the IFFT operation is transmitted (step S150).

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A data transmission apparatus comprising:
   a data processing unit for performing coding and modulation on an information bit to generate a data symbol;
   a single carrier-frequency division multiple access (SC-FDMA) processing unit for switching a weight matrix per switching period, for performing precoding on the data symbol by using the switched weight matrix, and for performing SC-FDMA modulation to generate an SC-FDMA symbol; and
   a radio frequency (RF) unit for transmitting the SC-FDMA symbol.

2. The data transmission apparatus of claim 1, wherein the SC-FDMA processing unit performs a discrete Fourier transform (DFT) process and an inverse fast Fourier transform (IFFT) process for the generation of the SC-FDMA symbol.

3. The data transmission apparatus of claim 1, wherein the SC-FDMA processing unit performs the precoding in the switching period by setting the switching period as a slot including a plurality of SC-FDMA symbols.

4. The data transmission apparatus of claim 1, wherein the SC-FDMA processing unit performs the precoding in the switching period by setting the switching period as an SC-FDMA symbol.

5. The data transmission apparatus of claim 1, wherein the SC-FDMA processing unit switches the weight matrix per switching period within a range of a predetermined set of weight matrixes.

6. The data transmission apparatus of claim 5, wherein the predefined set of weight matrixes is a set of codebooks with a rank 1.

7. A data transmission apparatus comprising:
   a data processing unit for performing coding and modulation on an information bit to generate a data symbol;
   a discrete Fourier transform (DFT) unit for performing DFT on the data symbol to generate a frequency-domain symbol;
   a precoding control unit for switching a weight matrix per switching period which is set as a slot or single carrier-frequency division multiple access (SC-FDMA) symbol, and for providing the switched weight matrix to a precoding unit;
   the precoding unit for performing precoding on the frequency-domain symbol by using the switched weight matrix;
   a subcarrier mapper for mapping the precoded frequency-domain symbol to a subcarrier;
   an inverse fast Fourier transform (IFFT) unit for performing IFFT on an output of the subcarrier mapper to generate an SC-FDMA symbol; and
   a radio frequency (RF) unit for transmitting the SC-FDMA symbol.

8. A data transmission method in a wireless communication system, comprising:
   performing coding and modulation on an information bit to generate a data symbol;
   performing precoding on the data symbol by using a weight matrix which is switched in a switching period;
   performing a process of generating a transmission symbol for the precoded data symbol; and
   transmitting the transmission symbol.

9. The data transmission method of claim 8, wherein the transmission symbol is a single carrier-frequency division multiple access (SC-FDMA) symbol.

10. The data transmission method of claim 8, wherein the transmission symbol is a clustered discrete Fourier transform-spread-orthogonal frequency division multiplexing (DFT-S-OFDM) symbol for frequency selective scheduling.

11. The data transmission method of claim 8, wherein the wireless communication system is an SC-FDMA system, a radio frame used in the SC-FDMA system includes a plurality of subframes, each subframe includes a plurality of slots, and each slot includes a plurality of SC-FDMA symbols.

12. The data transmission method of claim 11, wherein the switching period is the slot.

13. The data transmission method of claim 11, wherein the switching period is the SC-FDMA symbol.

14. The data transmission method of claim 8, wherein the weight matrix is selected randomly.

15. The data transmission method of claim 8, wherein the weight matrix is selected from a predetermined set of weight matrixes.

* * * * *